US005185895A

United States Patent [19]

Gagne et al.

[11] Patent Number: 5,185,895

[45] Date of Patent: Feb. 16, 1993

[54] PATIENT LIFT AND TRANSPORT AID

[76] Inventors: Eugene Gagne, 3891 Arbutus Street, Vancouver, British Columbia, Canada, V6J 3Z9; Alvin Wolfe, 6205 Balaclava, Vancouver, British Columbia, Canada, V6W 1L5

[21] Appl. No.: 828,776

[22] Filed: Jan. 30, 1992

[51] Int. Cl.5 .............................................. A61C 7/10

[52] U.S. Cl. .......................................... 5/86.1; 5/83.1

[58] Field of Search ........................ 5/81.1, 83.1, 86.1, 5/87.1; 254/7.12, 7.13, 8.12, 8.13; 212/264

[56] References Cited

U.S. PATENT DOCUMENTS

| | | | |
|---|---|---|---|
| 2,914,110 | 11/1959 | Schulte | 5/81.1 |
| 2,959,791 | 11/1960 | Ramsey | 5/86.1 |
| 2,962,730 | 12/1960 | Carnes et al. | 5/86.1 |
| 2,991,485 | 7/1961 | Schulte | 5/81.1 |
| 3,629,880 | 12/1971 | van Rhyn | 5/83.1 |
| 3,940,808 | 3/1976 | Petrini | 5/83.1 |
| 4,157,593 | 6/1979 | Kristensson | 5/81 R |
| 4,232,412 | 11/1980 | Petrini | 5/83.1 |
| 4,399,572 | 8/1983 | Johansson | 5/81 R |
| 4,443,902 | 4/1984 | Baer | 5/81.1 |
| 4,682,377 | 7/1987 | Reich | 5/86 |
| 4,703,523 | 1/1987 | James | 5/83 R |
| 4,704,749 | 11/1987 | Aubert | 5/81.1 |
| 4,918,771 | 4/1990 | James | 5/81 R |
| 4,947,497 | 8/1990 | Merchand | 5/86.1 |
| 5,001,789 | 3/1991 | Schoenberger | 5/81 B |

FOREIGN PATENT DOCUMENTS

| | | | |
|---|---|---|---|
| 2461492 | 3/1981 | France | 5/83 |

*Primary Examiner*—Michael F. Trettel
*Attorney, Agent, or Firm*—Vinson & Elkins L.L.P.

[57] ABSTRACT

Apparatus for lifting and transporting invalids, patients and the like which includes a base frame, a wheel assembly affixed to said base frame for transporting the latter over a support surface, vertically oriented guide posts affixed to said base frame, a carriage assembly slidably coupled to said guide posts, actuator means for moving said carriage along said guide posts in response to operator applied control signals, an arm member projecting out from said carriage having a patient support attachment coupled at a distal end thereof, and a motor for operating said actuator.

16 Claims, 9 Drawing Sheets

PATIENT LIFT AND TRANSPORT AID

BACKGROUND

The present invention relates to a device for assisting in the lifting or lowering of handicapped or other incapacitated persons from a bed, chair, bath or commode and for transporting such persons to a desired location.

There are a multitude of different apparatus for lifting and transporting invalids. U.S. Pat. No. 5,001,789 issued to Schoenberger discloses an apparatus for lifting and transporting an invalid which consists of a wheeled support having a vertical stanchion and a complex framework for supporting the invalid in a position with his/her knees bent and elevated so that the invalid is almost horizontal and face down. Not only is the device relatively expensive but the invalid is transported while raised well above the floor level leading to the risk of tipping sideways and consequent serious injury.

There are a variety of sling arrangements for hoisting up invalids and the like but these involve strapping the arms and possibly the legs. The placement of such straps often requires time and effort to place the straps on the invalid in the desired location and then subsequent removal of the straps. For example, U.S. Pat. No. 4,157,593 issued to Kristensson discloses a mobile patient lift and transport apparatus in which a belt having a handle at each end passes over a person's thigh while the person is in a position leaning forward from a sitting position with that person's knees pressed against a knee-support.

Generally, there is a need for a lifting and transporting apparatus which is simple to operate and requires a minimum of work on the part of the operator to attach the person to the apparatus. Any such lifting device should accommodate the changing horizontal position of a person as that person is standing up or sitting down.

SUMMARY OF THE INVENTION

According to the invention there is provided apparatus for lifting and transporting invalids, patients and the like which includes a base frame, a wheel assembly affixed to the base frame for transporting the latter over a support surface, a vertically oriented guide post affixed to the base frame, a carriage assembly slidably coupled to the guide post, actuator means for moving the carriage along the guide post in response to operator applied control signals, an arm member projecting out from the carriage having a patient support attachment coupled at a distal end thereof.

The arm member telescopes reversibly from a retracted position in response to movement of the carriage over the guide posts to an extended position. Further, the arms may be reversibly rotatable from a substantially horizontal position to a substantially vertical one. A motor may be used for operating the actuator. The arms may also pivot laterally in planes which are inclined slightly downwardly and inwardly so that a user's weight produces small inwardly directed components of force on each arm.

Advantageously, the actuator means is an elongated telescoping actuator coupled between the base frame and the carriage assembly for moving the carriage along the guide posts. Preferably, the apparatus includes a pair of spaced apart arm members projecting out from the carriage, each arm having a patient support attachment coupled at a distal end thereof. The arms may each be reversibly rotatable from a substantially horizontal position to a substantially vertical one and laterally pivotal over a limited angle so as to accommodate different sized patients.

Each of the arm members may include a hollow arm and an insertable one telescoping into and out of the hollow arm in response to movement of the carriage assembly, the trajectory of the insertable arm being first upwardly inclined toward the guide posts and then vertically upwards when the carriage assembly is being raised.

Advantageously, the trajectory of the insertable arm upon downward movement of the carriage assembly from an uppermost position with respect to the guide posts is first inclined downwardly and outwardly from the guide posts and then vertically downward.

By following a trajectory in which upward motion is inclined upwardly towards the guide posts and then rises vertically, there is a match to the actual trajectory a person follows in rising from a seated position. Similarly, by first moving vertically downward and then inclined away and downwardly from the guide posts, the actual trajectory of a person going from a standing position to a seated position is followed.

Thus, there is no need for nurses to manually move a patient while installing a sling or in moving that patient to a seat or other supporting structure before being able to rely on the machine to do the work. With the present device the operator merely wheels the apparatus into position, moves the arms of the apparatus so that they are proximate the patient, and then has the patient drape his arms over the under arm pads and grip the hand grips before causing the apparatus to raise that patient either from a lying to a seated position or to a standing position or vice versa.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
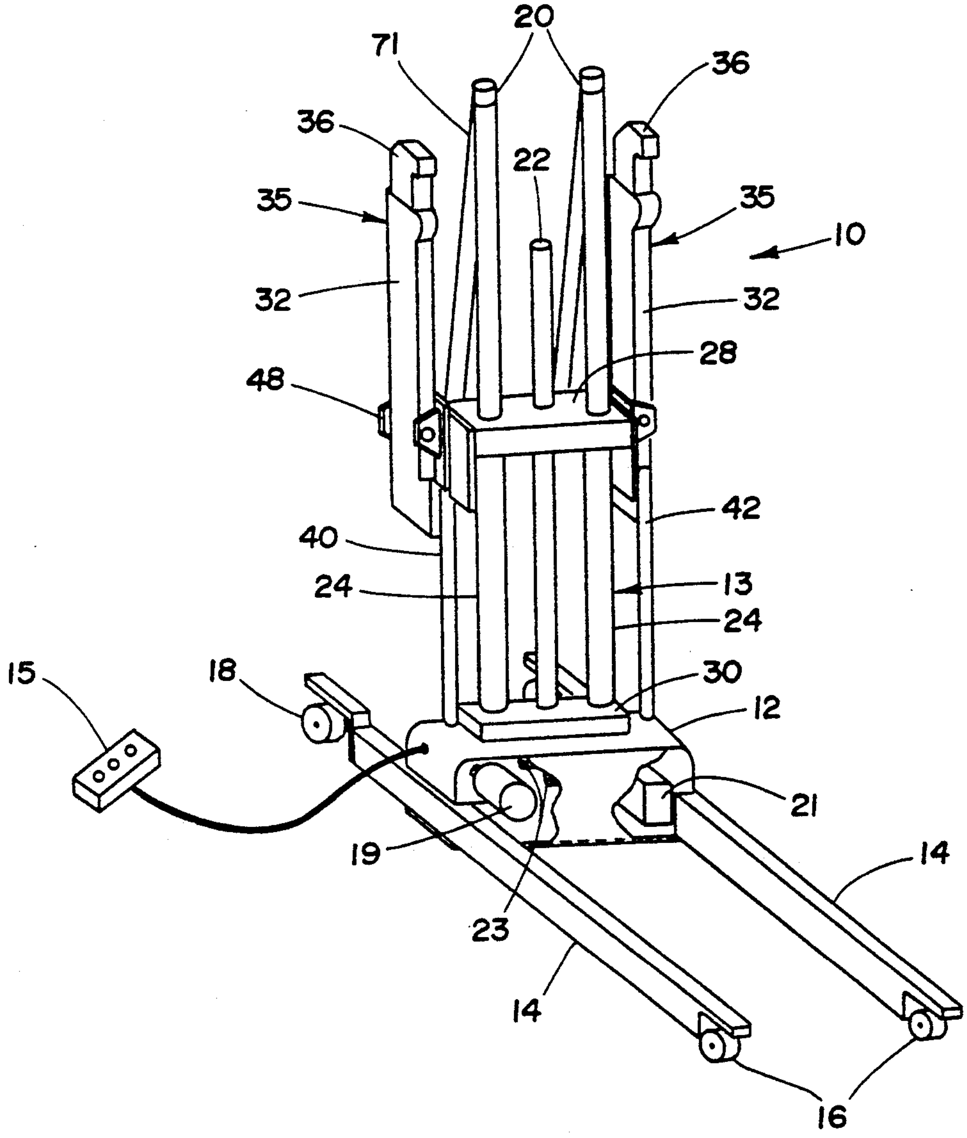
FIG. 1 is perspective view of the apparatus.

The lift and transport apparatus of FIG. 1 includes a base consisting of a pair of spaced apart rails 14 having casters 18 and 16. Rails 14 have affixed thereto and support a frame or box 12. Frame 12 houses a motor 19, a battery and battery recharger 21 and a number of gears 23. An operator control panel 15 is coupled to the box by means of flexible cable. Mounted on the frame 12 and extending into the latter are a pair of parallel, spaced apart guide shafts 20 and a center actuator 22. Positioned on either side of frame 12 are arm control assemblies 40 and 42.

Figure 10:
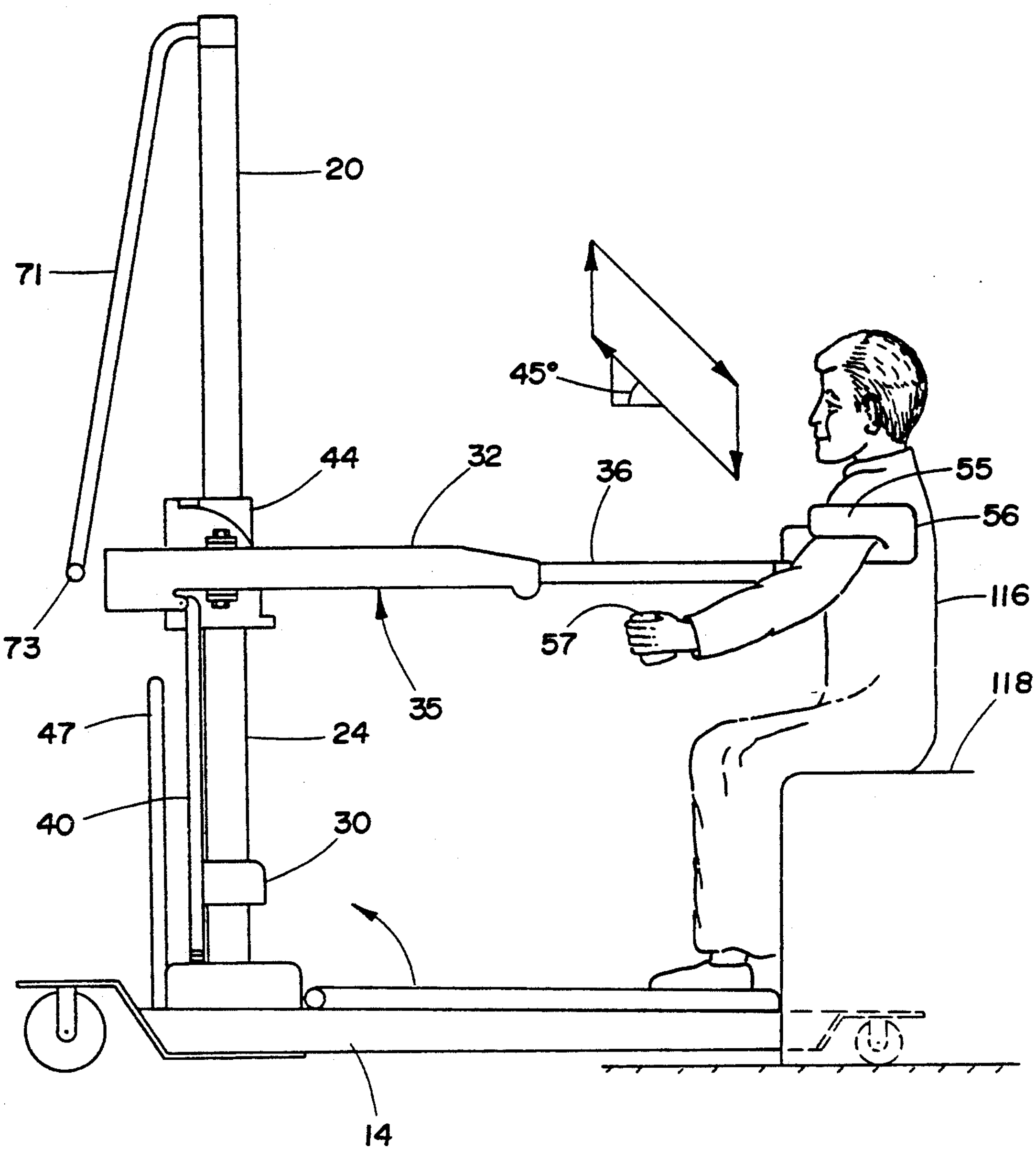
FIG. 10 is a side elevation view of the apparatus shown lifting a patient.

A carriage assembly 13 made up of vertical sections 24 and cross pieces 28 and 30 rigidly affixed to sections 24, slides vertically over shafts 20. The outside tube 31 of actuator 22 is welded to cross pieces 28 and 30. An inside shaft 33 of the actuator 22 is affixed to box 12 as shown in FIG. 5. Inside shaft 33 forms the casing of a hydraulic piston cylinder unit in which a central rod (not shown) whose top end is affixed to a plate (also not shown) within outside tube 31 is raised upwardly by hydraulic pressure and causes outside tube 31 to rise. On either side of cross piece 28 is mounted a pivotal arm assembly 35 made up of hollow arm 32 and telescoping insertable arm 36. The arm 32 is rotatable from a vertical position to a horizontal position. Insertable arms 36 may be extended by operation of a pulley system as shown in detail in FIG. 4. They may also be laterally pivotal to a limited extent about a hinge mounting assembly 48. A handle assembly 71 is affixed to the top of guide posts 20. The assembly 71 includes a transverse bar 73 at the bottom thereof as seen in FIGS. 5 and 10.

Figure 2:
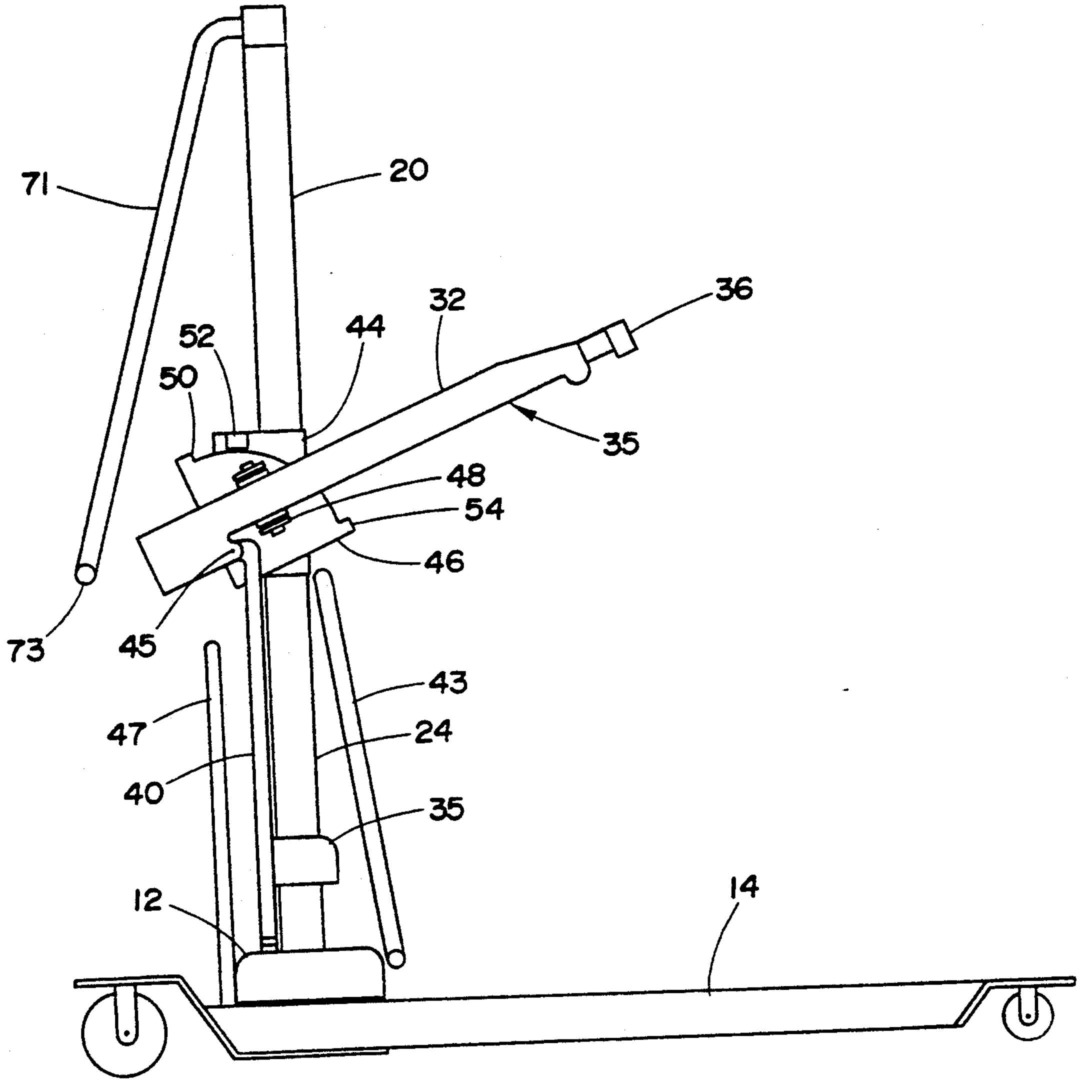
FIG. 2 is side elevation view of the apparatus with the lift arms in an intermediate position between vertical and horizontal.

FIG. 2 shows in more detail the mounting structure of arm assembly 35. A plate 44 is welded to each end of cross piece 28. A stop 52 is affixed to and projects out from the surface of plate 44. A quarter circular plate 46 having stop projections 50 and 54 at the ends of the arcuate portion is pivotally mounted to plate 44 by pin 45. Hollow arm 32 rotates with plate 46 and is affixed thereto by hinge assembly 48. Hinge assembly 48 allows limited lateral movement of arms 32 and 36 so as to facilitate their being positioned around a patient. The pivotal axes of arms 35 is slightly inclined to the vertical when arms 32 are in a horizontal position so that the lateral pivoting of arms 32 is slightly inclined inwardly and downwardly from the horizontal as shown in FIG. 5. In the vertical position top projection 54 abuts stop 52 while in the horizontal position stop projection 50 abuts stop 52. A handle framework 71 shown in dotted lines may be affixed to motor box 12 as shown and used by an operator to move the apparatus. A foot rest assembly 43 which is shown pivoted upright to a stored position is journaled to a brackets affixed to box 12 as shown.

Figure 3:
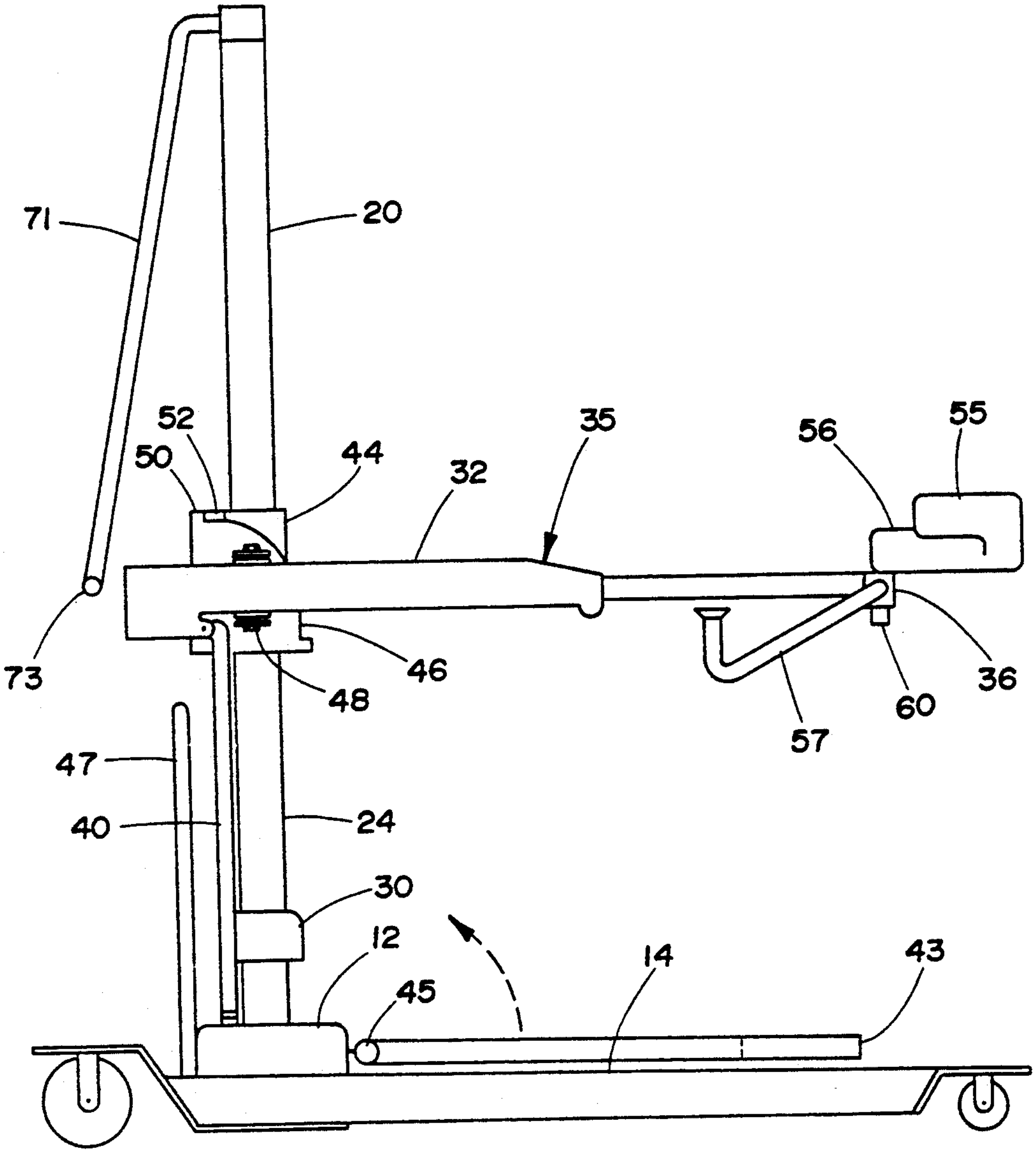
FIG. 3 is side elevation view of the apparatus with the lift arms extended and the arm support pads and handles shown.

FIG. 3 shows the lift and transport apparatus with the arm assembly 35 in a horizontal position and insertable arm 36 extended. A handle 57 is removably affixed to the distal end of each arm 36 as shown. An arm support pad 56 has a shaft 60 which inserts into one of two slots at the end of insertable arm 36. One slot is open and the other has a closed bottom to set the pad 56 at a higher elevation. The pad 56 has a wing 55 which extends to the side and is spaced apart from the pad main portion so as to provide a U-shaped arm receptacle that prevents a patients arms from being pulled outwardly by the action of his own weight on the inside of pad 56. A foot rest structure 43 has pins 45 affixed to box 12 about which the structure 43 pivots. A pair of spaced apart vertical levers 47 are each pivotal and serve to move a forward end of associated rails 14 inwardly or outwardly.

Figure 4:
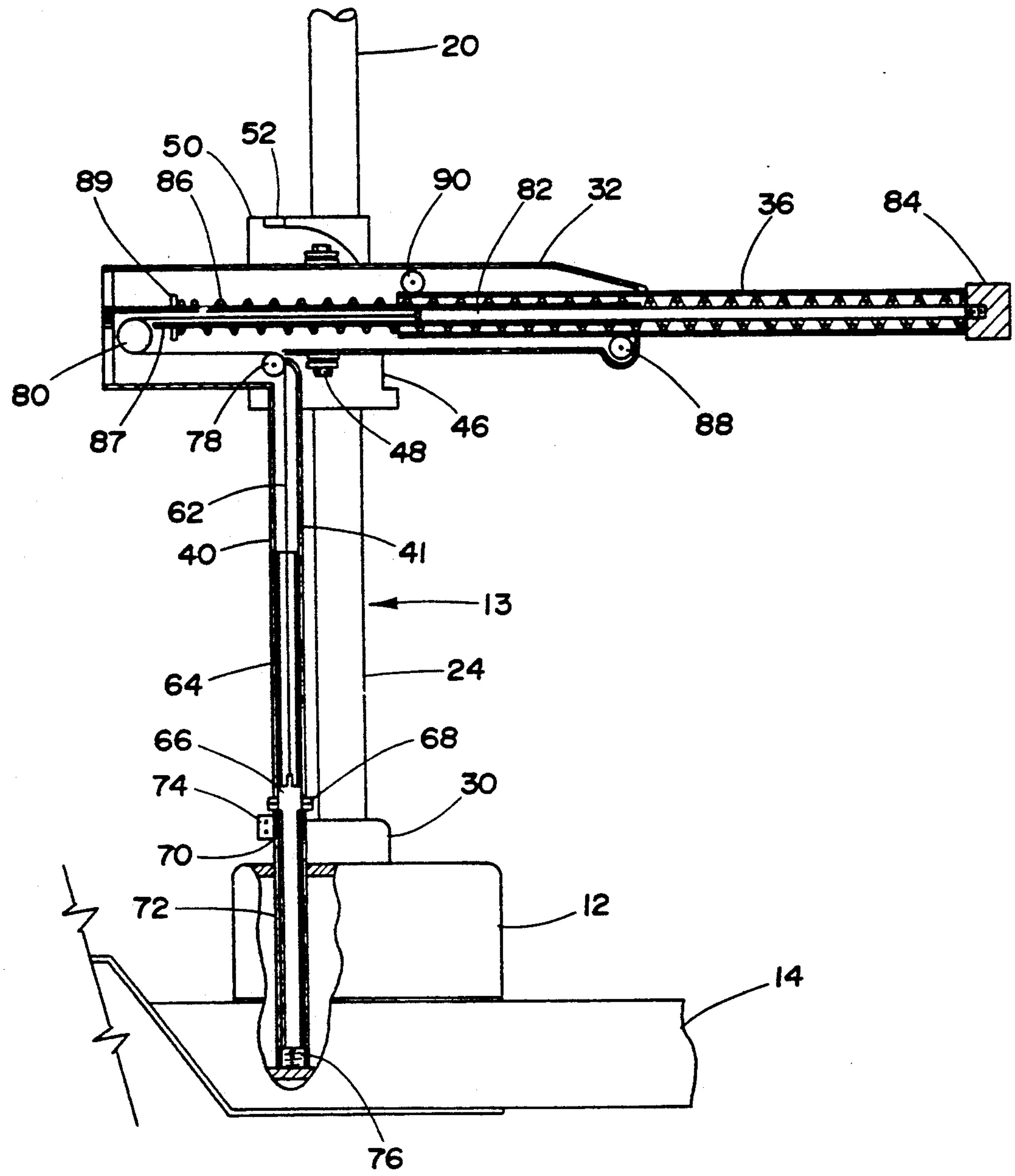
FIG. 4 is an elevation view partly in section showing the mechanism for extending and retracting the lift arms.
Figure 5:
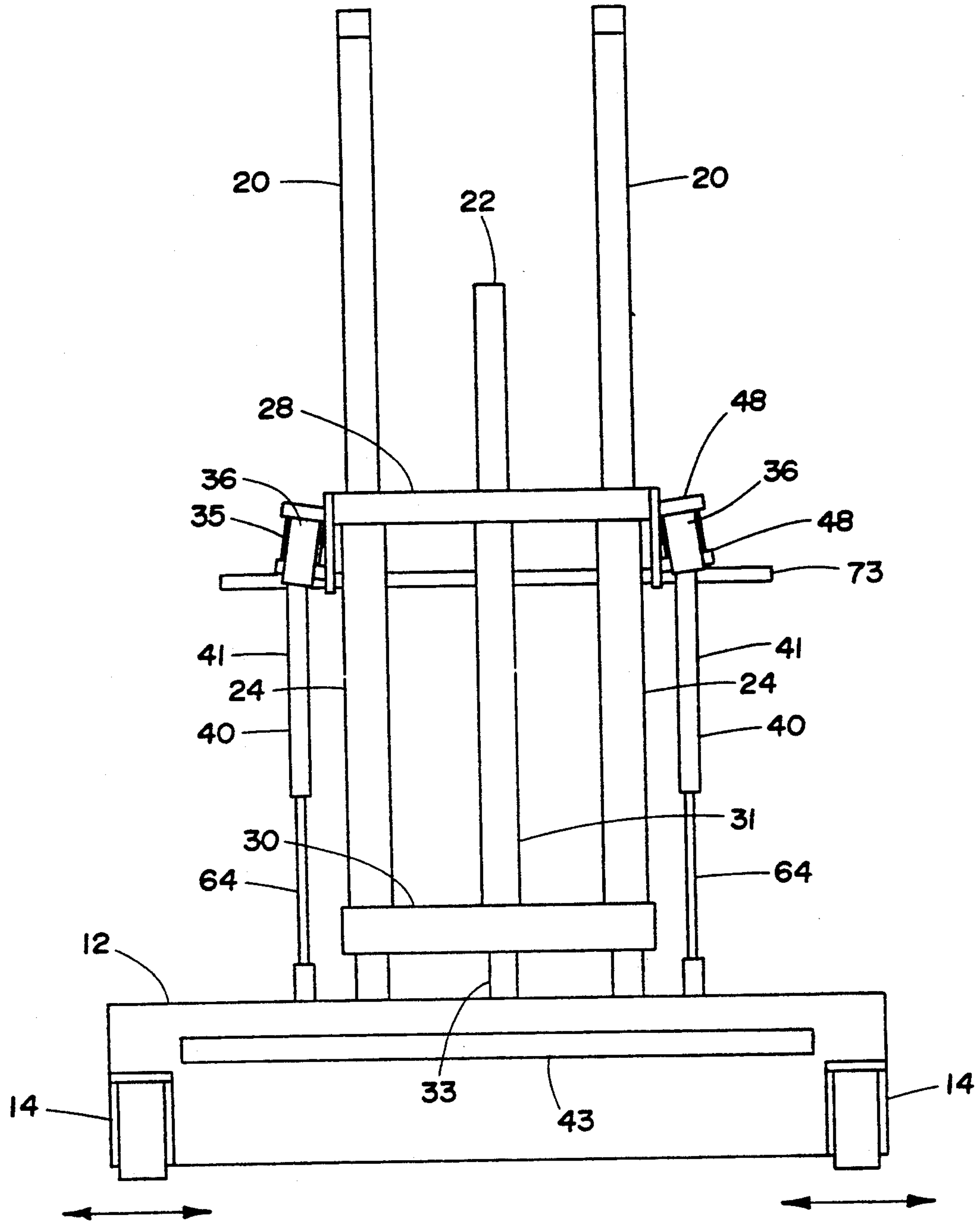
FIG. 5 is a front elevation view showing the apparatus.

FIG. 4 shows the pulley system used in extending and retracting insertable arm 36. Arm 36 is hollow and has an elongated rod 82 threaded into distal end 84. A hollow tube 87 is threaded into the end of hollow arm 32 and slides over rod 82. A long helical spring 86 extends from a locked ring 89 affixed to tube 87 into insertable arm 36 and against distal end 84 biasing the latter outwardly of hollow arm 32 with a force of approximately 40 pounds. Roller 88 journaled to hollow tube 32 and roller 90 journaled to arm 36 near an end thereof, control the telescoping of insertable arm 36 with respect to hollow arm 32. A chain 62 extends from an end of rod 82 around pulleys 80 and 78 along the interior axis of arm control assembly 40 to elongated friction shaft 66. Friction shaft 66 is an elongated cylinder that passes through a threaded insert 70 threadedly engaged with outer tube 72. A split ring 74 encircles the outer tube 72 and applies pressure to insert 70, thereby increasing the sliding friction between insert 70 and shaft 66. The tension necessary to retract shaft 66 from tube 72 is 30 pounds, 10 pounds less than that necessary to retract insertable are 36. Threaded barrier 76 is threaded into and end of tube 72 and acts as a stop for shaft 66. Shaft 66 has a pair of flanges 68 near the top thereof.

Arm control assembly 40 consists of an outer tube 41 and a telescoping inner tube 64 which slides within the outer tube 41. Outer tube 40 couples to hollow arm 32 around pulley 78. As the arm 32 is raised by the carriage assembly 13, outer tube 41 slides over inner tube 64 withdrawing from abutment with flange 68. Tension in chain 62 causes insertable arm 36 to be drawn into hollow arm 32. Once arm 36 has been fully inserted into arm 32, further upward movement of carriage assembly 13 causes the tension on chain 62 to pull out friction shaft 66 from tube 72 against the friction of insert 70. Such upward movement is not accompanied by any further insertion of arm 36 into hollow arm 32. It will be appreciated that the insertable arm 36 inserts into hollow arm 32 so that any point on the insertable arm describes a straight line at an angle of 45° to guide shafts 20 while outer shaft is continuing to withdraw and then a straight vertical line when shaft 66 withdraws. The latter path describes generally the path of any point on a patient while moving from a sitting position to a standing one.

As carriage assembly 13 is lowered, insertable arm 36 begins to extend until outer tube 41 contacts flange 68. When arm 36 has been fully extended tube 41 presses shaft 66 down a further eight inches without any further telescoping of arm 36. Such motion approximates the trajectory of the head of a patient when going from a standing to a sitting position.

Figure 6:
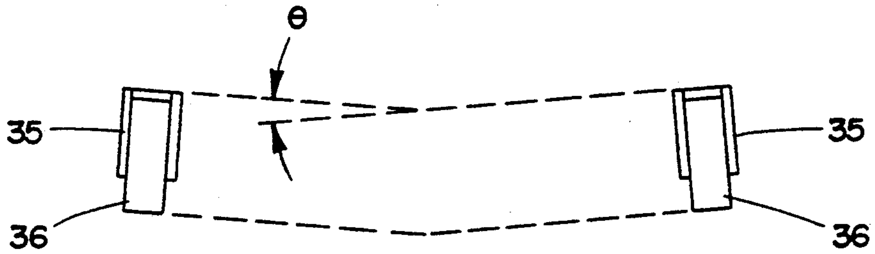
FIG. 6 is a front elevation view showing only the lift arms and their trajectory when pivoted laterally.
Figure 7:
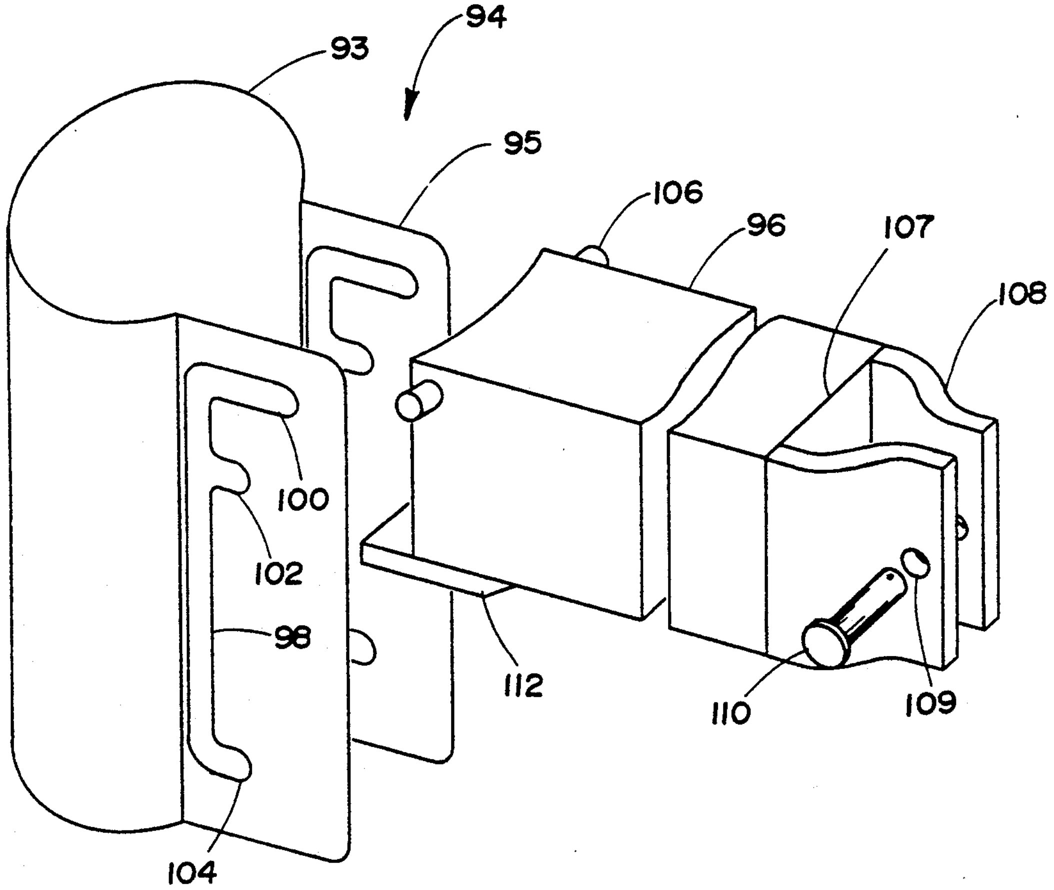
FIG. 7 is exploded perspective view of a center arm and center arm support.

Referring to FIG. 5 the apparatus is shown in front elevation with the arm assemblies 35 in a horizontal position and hollow arm 31 pivotally mounted by brackets 48. Rails 14 are laterally pivotal as shown so that in difficult turns the rails 14 may be individually moved sideways to facilitate passage. In addition, when lifting a patient from a wheelchair it is necessary to be able to widen the space between the legs to admit the wheelchair. Hollow arms 32 and insertable arms 36 are pivotally mounted to hinge mounting assemblies 48 so that when arms 32 and 36 are horizontal they pivot inwardly and slightly downwardly. The purpose for this tilted pivotal axis is to ensure that the weight of a patient on the arms 36 causes the inward pivoting of the arms so that a slight pressure on the patient being engaged by the arms 36 is achieved. FIG. 6 shows the traverse of the arms 36 on pivoting inwardly. The angle $\theta$ is the total relative angle of inclination of arms 36. FIG. 7 shows in perspective a center arm mounting assembly 94 consisting of a partial cylindrical portion 93 and a pair of spaced apart parallel clevis plates 95. Plates 95 have three horizontal slots 100, 102 and 104, one end of each of which is joined to a single vertical slot 98. A center arm 96 has a pin 106 near the top and a stop plate 112 which extends out from the bottom end as shown. The opposite end of the arm 96 has a pair of curved plates 108 each with a pin hole 109 which slidably admits a pin 110 for attaching a device to be picked up and transported (not shown).

Figure 8:
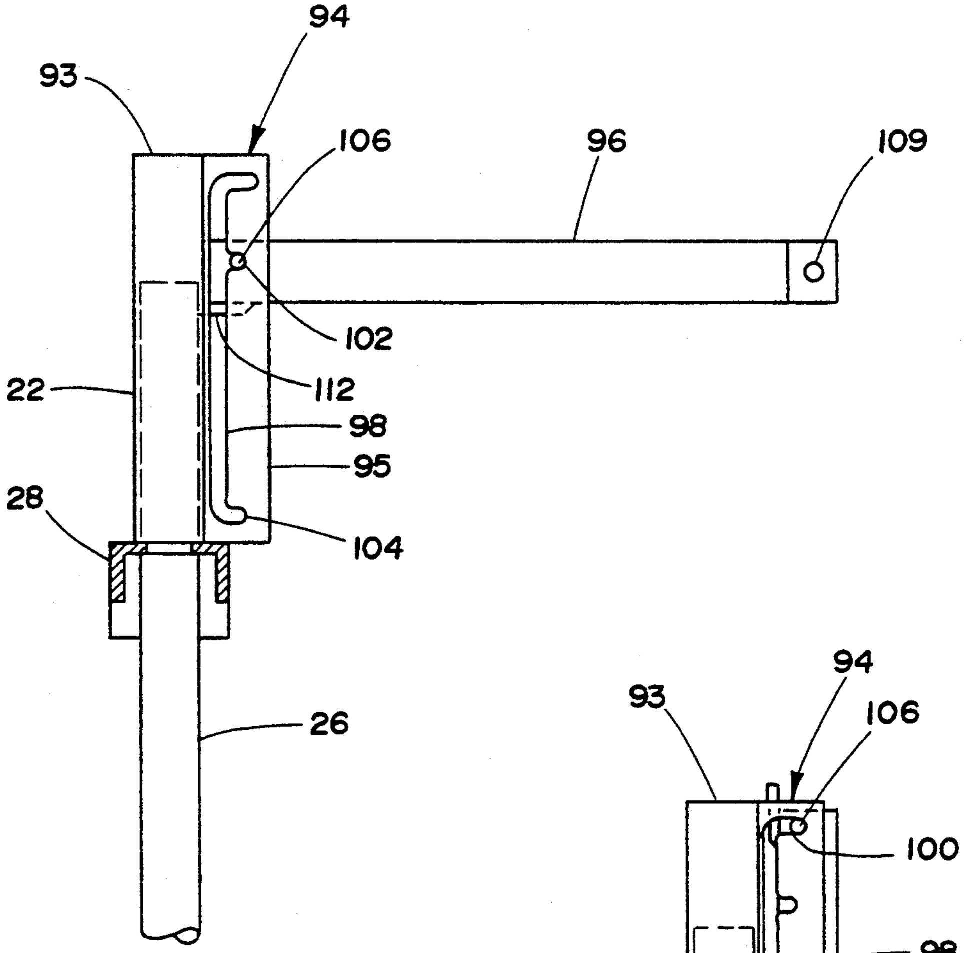
FIG. 8 is a partial side elevation view of the center post and arm with the arm extended.
Figure 9:
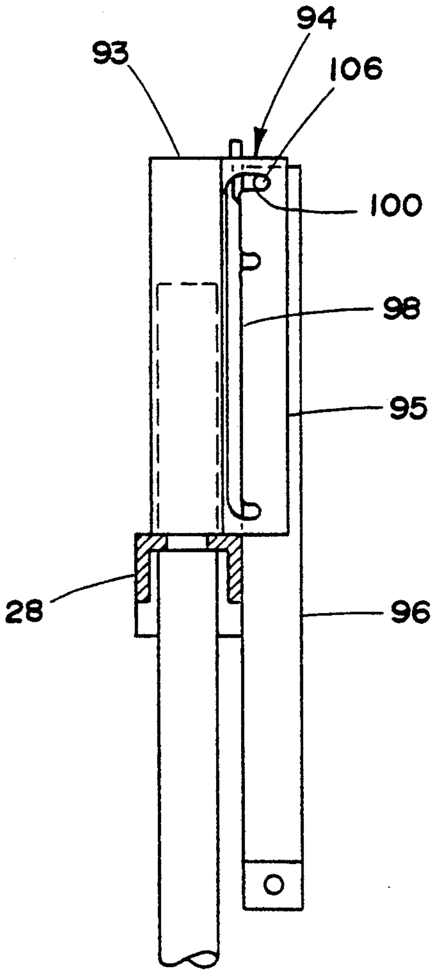
FIG. 9 is a partial side elevation view of the center post and arm with the arm in a stored position.

As shown in FIGS. 8 and 9 cylindrical portion 93 slidably fits over center actuator 22 and rests on cross piece 28 of carriage assembly 13. Arm 96 fits between plates 95 and through slots 102. Stop plate 112 abuts actuator shaft 22 thus maintaining arm 96 in an extended horizontal position. A lowered vertical position is available by moving pins 106 down to bottom slot 104. In this position a device such as a commode or a sling may be affixed to the end of the arm 96 and transported to a desired location. FIG. 9 shows the arm 96 in a stored position with pin 106 in slot 102 and cylindrical portion raised so that plate 112 is above the top of actuator shaft 22. A clip (not shown) is used to retain arm 96 against unintentional movement.

FIG. 10 shows how the apparatus is used to raise a patient 116 from a sitting position on a bed 118 or the like to a standing position. The patient is positioned so that his/her armpits rest on pads 56. The small amount of lateral adjustment of each arm assembly 35 allows the pads 56 to fit almost any size of patient. Gripping the hand grips 57 the motor driving the actuator 22 is actuated to raise the carriage assembly 13 and, hence the arm assemblies 35. As arm assemblies 35 are raised, insertable arms 36 are retracted into hollow arms 32 such that the pads 56 follow a 45° trajectory and then a vertical trajectory as shown until the patient is fully raised. Once raised the patient may be wheeled to any desired location. Safety straps 55 (see FIG. 9) are ordinarily placed around the arms of the patient to avoid accidental falling. Once at the desired location the patient is lowered into position on a bed or the like by lowering carriage 13 so that arms 36 follow first a 45° downwardly directed trajectory and then a vertically downward trajectory also as shown.

Figure 11:
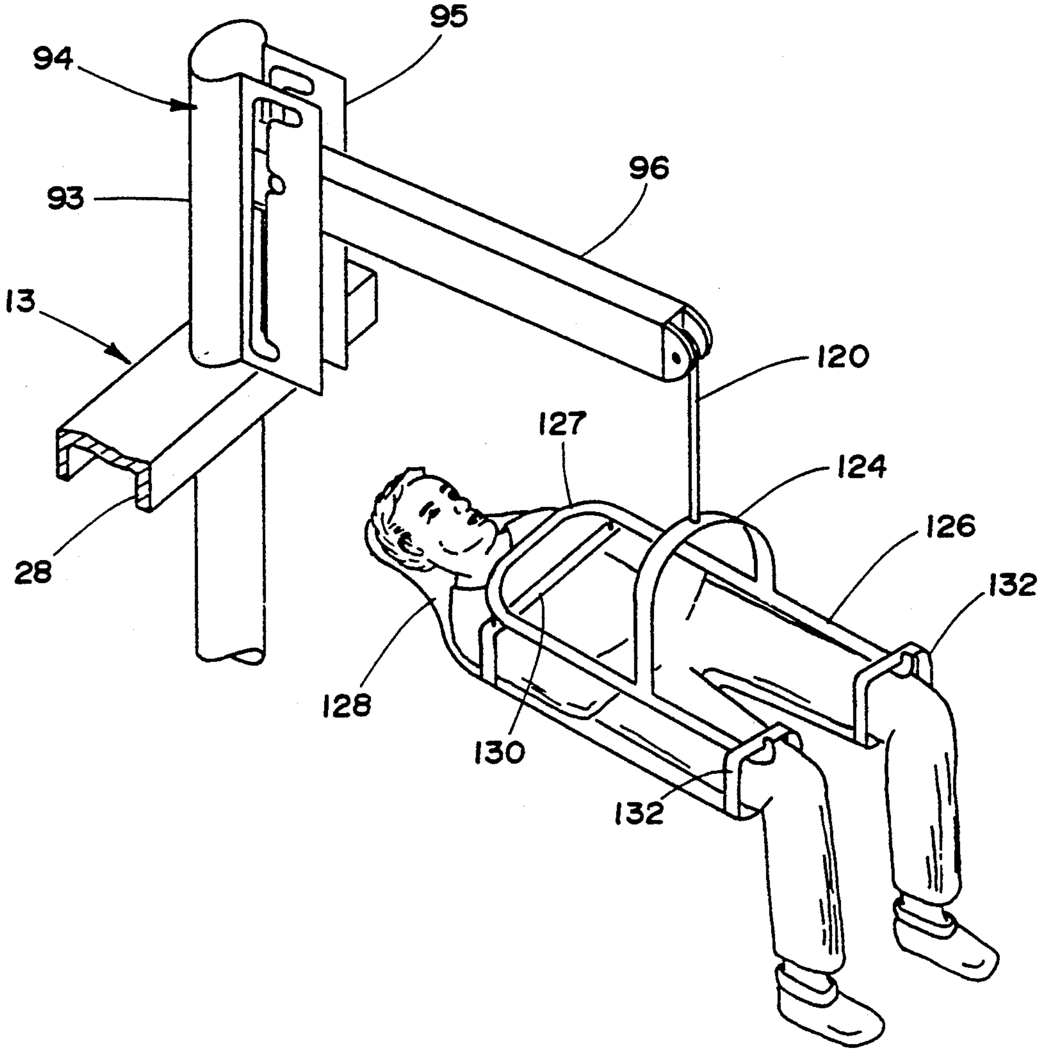
FIG. 11 is a partial perspective view of the actuator and center post with a sling attached thereto.

FIG. 11 is a partial perspective view of the actuator 22 and center post mounting assembly 94 as used to support a sling. The assembly 94 includes a partial cylindrical sleeve 93 which integrally connects to the pair of parallel clevis plates 95 and center arm 96 mounted in slots in plates 95. A patient is placed on a sturdy sheet material 128 which has straps 130 and 132 and the straps cinched up. Next a U-shaped frame 127 is hooked at the curved end to strap 130 and, at the other end leg strap engaging members 126 hook onto straps 132. A second U-shaped member 124 is attached at its ends to frame 127 A large hook 120 suspends members 124 and 127 from the end of arm 96 as shown. There are various other sling designs that could be employed.

Optionally, the distal end 107 of arm 96 may be inserted into a back of a commode to raise both the patient and the commode and then to lower both into a bath.

Operationally, the electrical controls are in the form of foot switches located on motor box 12 (not shown). Normally an operator, using the handle framework shown in FIG. 2, pushes the apparatus to a desired location such as to a patient's bed where the apparatus is used to lift the patient to a standing position and then to transport him to the desired location.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. Apparatus for lifting and transporting invalids, patients and the like, comprising:

(a) a base frame;

(b) wheel means affixed to said base frame for transporting the latter over a support surface;

(c) vertically oriented guide posts affixed to said base frame;

(d) a carriage assembly slidably coupled to said guide posts;

(e) actuator means for moving said carriage along said guide posts in response to operator applied control signals; and (f) an arm member projecting out from said carriage having a patient support attachment coupled at a distal end thereof; and (g) means for causing said arm member to telescope reversibly from a retracted position to an extended position.

2. Apparatus according to claim 1, wherein said wheel means includes a pair of elongated rails affixed to said base frame, said rails having a pair of forward and rear casters journaled thereto.

3. Apparatus for lifting and transporting invalids, patients and the like, comprising:

(a) a base frame;

(b) wheel means affixed to said base frame for transporting the latter over a support surface;

(c) vertically oriented, spaced apart guide posts affixed to said base frame;

(d) a carriage assembly slidably coupled to said guide posts, (e) an elongated telescoping actuator coupled between said base frame and said carriage assembly for moving said carriage along said guide posts;

(f) a pair of spaced apart arm members projecting out from said carriage each arm having a patient support attachment coupled at a distal end thereof; and (g) means for causing said arm members to telescope reversilby from a retracted position to an extended position in response to movement of said carriage over said guide posts.

4. Apparatus according to claim 3, including motor means for operating said actuator in response to user applied control signals.

5. Apparatus according to claim 3, wherein said arms are each reversibly rotatable from a substantially horizontal position to a substantially vertical one and laterally pivotal over a limited angle so as to accommodate different sized patients.

6. Apparatus according to claim 3, wherein said arms are pivotal toward and away from one another through a limited range.

7. Apparatus according to claim 3, wherein each of said arm members includes an insertable arm movable from an uppermost position with respect to said guide posts along a trajectory that is first inclined downwardly and outwardly from said guide posts and then is inclined vertically downward.

8. Apparatus according to claim 3, including a center post actuator mounting assembly having a sleeve conforming to the exterior shape of said actuator and slidable thereover, a center post, center post attachment means coupling said center post to said sleeve so that it is pivotal from a stored position in which it lies against said carriage assembly to an extended position in which it is substantially horizontal and a locking plate affixed to said center post so that when said sleeve is over said actuator said plate abuts said actuator and locks said post in the extended position.

9. Apparatus according to claim 3, including a pair of rails affixable to said base frame, said rails having casters on either end thereof.

10. Apparatus according to claim 9, wherein said rails are movable laterally to a limited extent.

11. Apparatus according to claim 3, wherein each of said arm members includes a hollow arm, an insertable arm, and means for causing said insertable arm to telescope into and out of said hollow arm in response to movement of said carriage assembly, said insertable arm movable in a trajectory which is first upwardly inclined toward said guide posts and then vertically upwards when said carriage assembly is being raised.

12. Apparatus according to claim 11, wherein the trajectory of said insertable arm upon downward movement from an uppermost position with respect to said guide posts is first inclined downwardly and outwardly from said guide posts and then vertically downward.

13. Apparatus according to claim 11 or 12, including an arm pad attachable to said insertable arm so as to engage the patient under the armpits.

14. Apparatus according to claim 11 or 12 including hand grips removably mounted on said insertable arm.

15. Apparatus according to claim 11 or 12, wherein the upwardly inclined portion of said trajectory forms an angle of inclination relative to an axis of each of said guide posts of 45 degrees.

16. Apparatus according to claim 15, further comprising a pair of rails each said pair of rails attached to a side of said base frame and laterally pivotable to a limited extent.

* * * * *